(12) United States Patent
Wunner

(10) Patent No.: US 7,945,666 B2
(45) Date of Patent: May 17, 2011

(54) METHOD, SYSTEM AND STORAGE MEDIUM FOR ESTABLISHING COMPATIBILITY BETWEEN IPSEC AND DYNAMIC ROUTING

(76) Inventor: Lukas Wunner, Tuebingen (DE)

( * ) Notice: Subject to any disclaimer, the term of this patent is extended or adjusted under 35 U.S.C. 154(b) by 1478 days.

(21) Appl. No.: 11/220,948

(22) Filed: Sep. 6, 2005

(65) Prior Publication Data

US 2006/0167894 A1    Jul. 27, 2006

Related U.S. Application Data

(63) Continuation-in-part of application No. PCT/DE2004/000426, filed on Mar. 4, 2004.

(60) Provisional application No. 60/499,982, filed on Sep. 3, 2003.

(30) Foreign Application Priority Data

Mar. 4, 2003    (DE) .................................. 103 10 253

(51) Int. Cl.
*G06F 15/173* (2006.01)
*G06F 15/16* (2006.01)
*G06F 12/00* (2006.01)
*H04L 12/28* (2006.01)
*H04L 29/06* (2006.01)

(52) U.S. Cl. ........ 709/225; 709/237; 370/401; 707/821; 713/150; 713/151

(58) Field of Classification Search .......... 709/217–229, 709/246, 242, 237; 707/1; 713/201, 151; 370/245, 401
See application file for complete search history.

(56) References Cited

U.S. PATENT DOCUMENTS

| | | | | |
|---|---|---|---|---|
| 2002/0078227 A1* | 6/2002 | Kronenberg | .................. | 709/237 |
| 2002/0083046 A1* | 6/2002 | Yamauchi et al. | ................. | 707/1 |
| 2002/0188871 A1* | 12/2002 | Noehring et al. | ............. | 713/201 |
| 2003/0005283 A1* | 1/2003 | Mualem et al. | ................ | 713/151 |
| 2003/0159067 A1* | 8/2003 | Stirbu | ........................... | 713/201 |
| 2004/0001497 A1* | 1/2004 | Sharma | ........................ | 370/401 |

* cited by examiner

*Primary Examiner* — Ian N Moore
*Assistant Examiner* — Kiet Tang

(57) ABSTRACT

A method, system and storage medium wherein reachability information is exchanged over IPsec tunnels by means of a dynamic routing protocol, but instead of incorporating it into the normal routing table, it is incorporated into the IPsec data structures SPD and SAD by performing a set of steps.[1] Thereby, disadvantages of prior art efforts to establish compatibility between IPsec and dynamic routing, for instance IIPtran (RFC 3884), are overcome in that compatibility is established without modifying the processing of datagrams by IPsec.[2] This may be implemented by extending the routing daemon so that it supports inserting or removing entries in the SPD and SAD using the PF KEY API.[3] Further embodiments feature cryptographically signing and filtering advertised reachability information, redistribution of reachability information between the dynamic routing in the base network and the overlay network, a new routing protocol tailored specifically to IPsec and load sharing over multiple IPsec tunnels.[4]

[1] [0043-0054]
[2] [0009-0023]
[3] [0064-0068]
[4] [0055-0059], [0061-0063], [0069-0079] and [0080-0081]

18 Claims, 7 Drawing Sheets

Fig. 2 outbound SPD — 14

| selectors | action |
|---|---|
| destination IP address = 172.16.2.171/32<br>destination port = 80<br>protocol = TCP | bypass |
| destination IP address = 172.16.0.0/16 | protect:<br>IPsec mode = tunnel mode<br>local tunnel address = 172.20.3.254<br>remote tunnel address = 172.16.3.254<br>IPsec protocol = ESP<br>ESP encryption algorithm = 3DES<br>ESP authentication algorithm = HMAC-SHA1<br>established SAs = <172.16.3.254, ESP, 1> |
| | |

18

Fig. 3 inbound SPD — 16

| selectors | action |
|---|---|
| source IP address = 172.16.2.171/32<br>source port = 80<br>protocol = TCP | bypass |
| source IP address = 172.16.0.0/16 | protect:<br>IPsec mode = tunnel mode<br>local tunnel address = 172.20.3.254<br>remote tunnel address = 172.16.3.254<br>IPsec protocol = ESP<br>ESP encryption algorithm = 3DES<br>ESP authentication algorithm = HMAC-SHA1 |
| | |

Fig. 5 routing table (51)

| destination | gateway | other parameters |
|---|---|---|
| 10.0.3.0/24 | 0.0.0.0 | metric = 0, ... |
| 10.0.2.0/24 | 0.0.0.0 | metric = 0, ... |
| 10.0.1.0/24 | 10.0.2.2 | metric = 1, ... |
| 10.0.1.0/24 | 10.0.3.1 | metric = 1, ... |
| 0.0.0.0/0 | 10.0.2.2 | metric = 1, ... |
| 0.0.0.0/0 | 10.0.3.1 | metric = 2, ... |

52 / 53 / 54

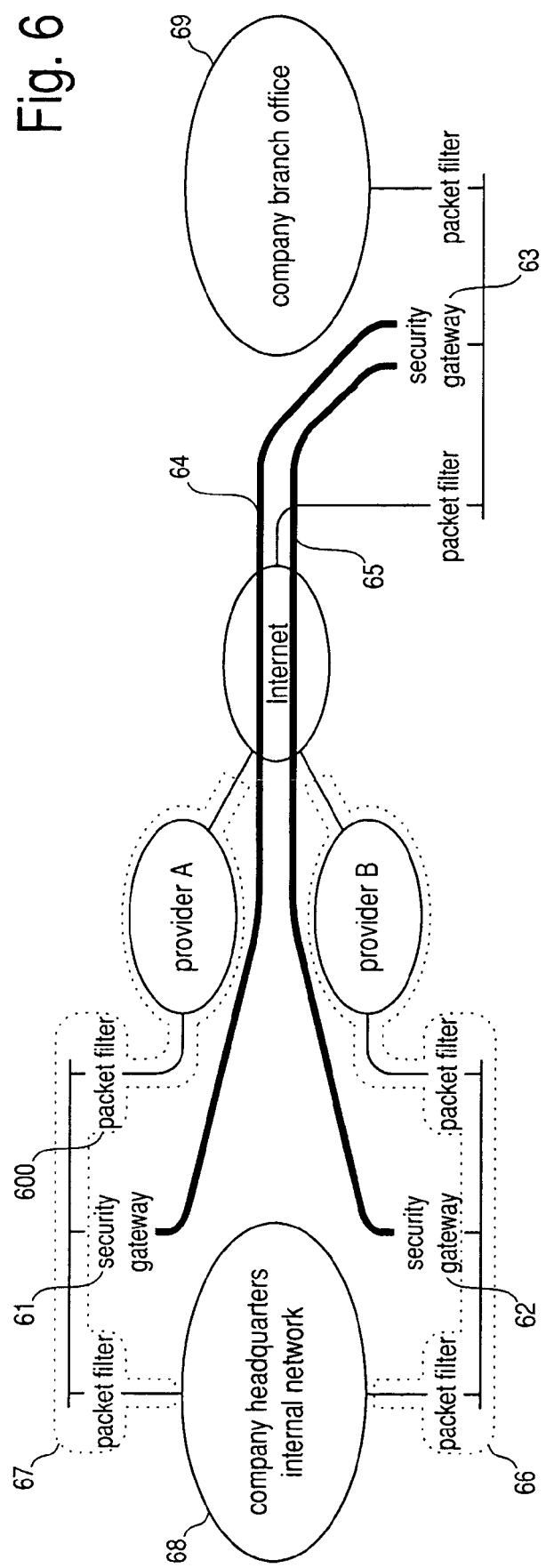

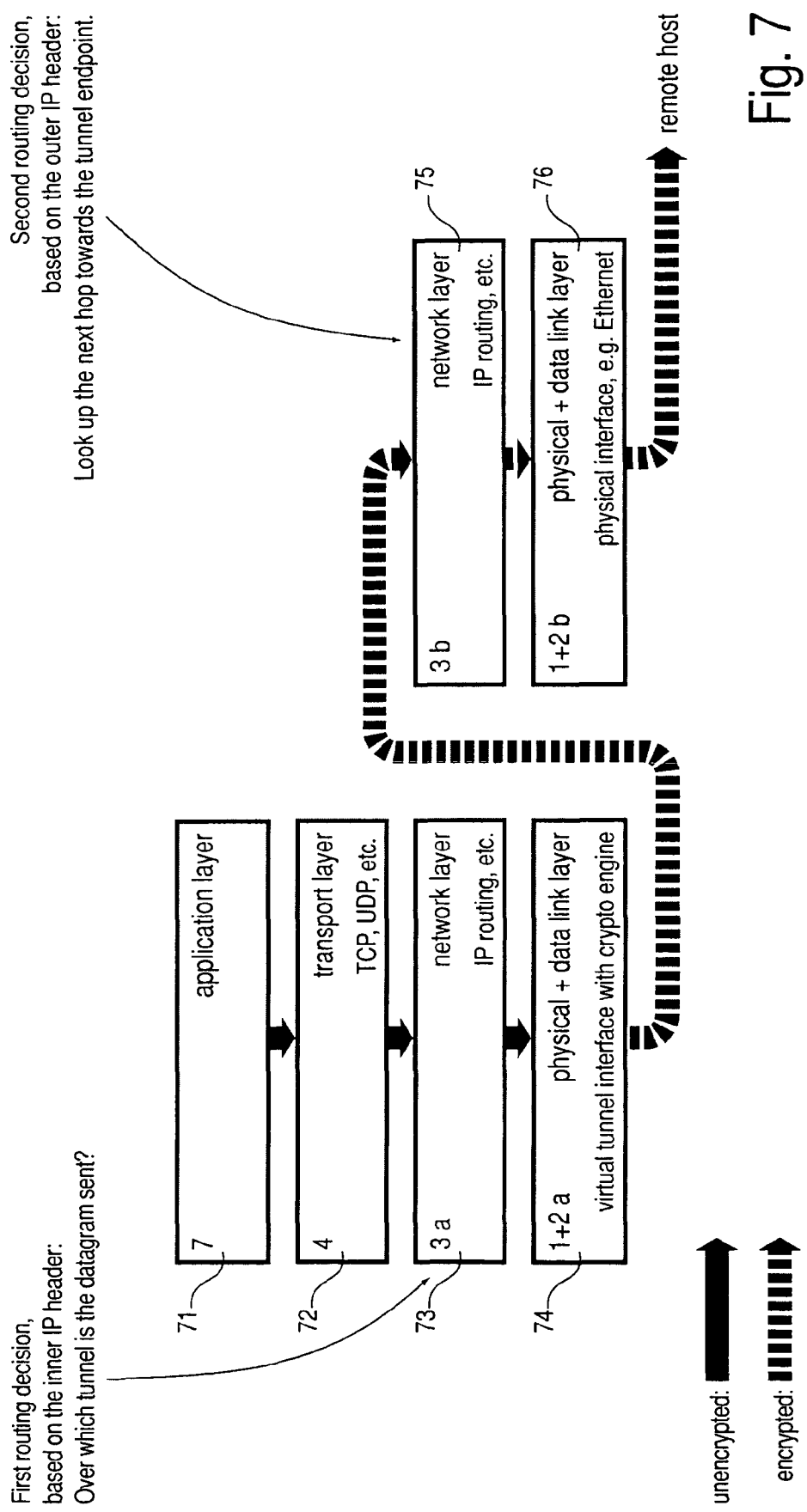

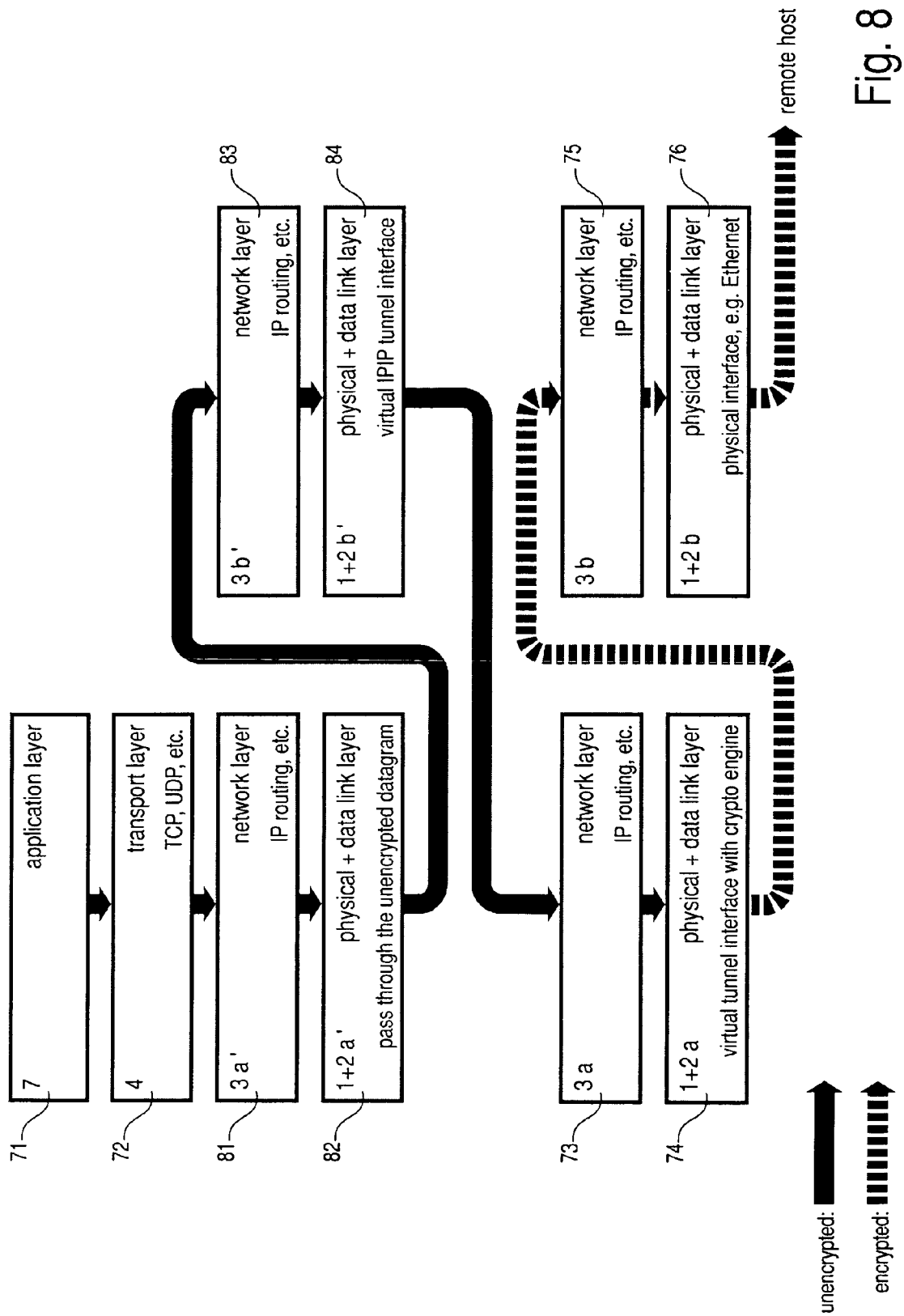

US 7,945,666 B2

1

METHOD, SYSTEM AND STORAGE MEDIUM FOR ESTABLISHING COMPATIBILITY BETWEEN IPSEC AND DYNAMIC ROUTING

CROSS-REFERENCES TO RELATED APPLICATIONS

This application is a continuation-in-part of PCT Application No. PCT/DE2004/000426, filed Mar. 4, 2004, which claims priority from German Application No. DE 10310253.1, filed Mar. 4, 2003 and the benefit of Provisional Application No. 60/499,982, filed Sep. 3, 2003.

BACKGROUND OF THE INVENTION

The present invention relates to methods for a data network according to the preamble of patent claim 1, to systems according to the preamble of claims 2, 4 and 5 and to a storage medium, respectively. In particular, the invention relates to the IPsec standard.

Known from the art is the "IPsec" protocol suite (RFC 2401, http://www.ietf.org/rfc/rfc2401.txt): IPsec is designed to provide interoperable, high quality, cryptographically-based security for the IPv4. and IPv6 protocols. The set of security services offered by IPsec includes access control, connectionless integrity protection of data, data origin authentication, protection against replay attacks, data confidentiality (via encryption), and limited traffic flow confidentiality. These services are provided at the IP layer (network layer), offering protection for IP and for all protocols that may be carried over IP. A common application of IPsec are "virtual private networks" (VPNs).

Further known from the art is the technology of "dynamic routing", which allows routers to communicate with each other by means of a dynamic routing protocol. Using such a protocol, a router can advertise to a neighbour router which networks are currently reachable through it. A router which receives this reachability information can propagate it to other routers. Thereby, simplified, all routers participating in the dynamic routing protocol know which networks are currently reachable over which paths. This enables failure safety and load balancing within the network as a whole. An example of a dynamic routing protocol is the "Border Gateway Protocol" (BGP, RFC 1771, http://www.ietf.org/rfc/rfc1771.txt).

The two technologies IPsec and dynamic routing are incompatible so far unless extra measures are taken. An explanation and graphical illustration concerning this issue is known from the Internet publication http://www.av8n.com/vpn/mast.htm. The graphical illustration from this Internet publication is reproduced in FIG. 7 in modified form. It shows the processing steps an IPsec-capable data processing apparatus has to carry out for outgoing datagrams. This illustration is not based on the ISO/OSI reference model, but rather on the more practically relevant TCP/IP reference model as described, among other publications, in the book "Computer Networks" by Andrew S. Tanenbaum (ISBN 0-13-394248-1). Its only difference to the ISO/OSI reference model is that the OSI layers 1 and 2 are combined into a single layer, and that the OSI layers 5 and 6 are omitted as they are rarely used in practice. FIG. 7 does employ the numbering scheme of the ISO/OSI reference model however because these numbers are commonly used.

On an IPsec-capable data processing apparatus, an outgoing datagram is first processed by IPsec (layer 3a and 1+2a, reference signs 73 and 74) and then sent out by the normal routing mechanism (layer 3b and 1+2b, reference signs 75

2 and 76). In the course of this, two routing decisions are made: The first routing decision 73 determines over which IPsec tunnel the datagram is sent. For this, the IPsec data structure "Security Policy Database" (SPD) 14 is used. The second routing decision 75 determines over which physical network interface or, put differently, to which "next hop" 53 the IPsec-processed datagram is sent. For this, the routing table 12 is used. The term "IPsec tunnel" denotes a pair of "Security Associations" (SAs) in "tunnel-mode" according to RFC 2401. Examples of the IPsec data structures outbound SPD 14, inbound SPD 16 and "Security Association Database" (SAD) 21 are depicted in FIG. 2 to 4.

The incompatibility of IPsec and dynamic routing arises because IPsec ignores the reachability information that a data processing apparatus receives by means of a dynamic routing protocol. This reachability information is stored in the routing table 12 by the routing daemon 23 which implements the dynamic routing protocol. IPsec does not consult that data structure.

The consequences of this incompatibility can be observed in the example network depicted in FIG. 6: The three security gateways 61, 62, 63 communicate over the two IPsec tunnels 64, 65 by means of a dynamic routing protocol. If one of the company headquarters' 68 two Internet connections 66, 67 fails, the security gateway 63 in the company branch office 69 learns this via the dynamic routing protocol, and it removes those routes from its routing table that relate to the failed Internet connection. IPsec should now send all data traffic over the tunnel which is running over the functioning Internet connection. This does not take place however, as IPsec ignores the reachability information which was received by means of the dynamic routing protocol. Therefore, the security gateway 63 in the company branch office 69 may continue to send data traffic over the failed tunnel, resulting in packet loss or at worst the complete failure of the VPN, even though a functioning tunnel is still available.

Known from the art is an effort to solve this issue called "IIPtran" (http://www.isi.edu/touch/pubs/draft-touch-ipsec-vpn-04.txt, published on 24 Jun. 2002). IIPtran replaces IPsec tunnel-mode by IPIP tunnels combined with IPsec transport-mode: For outgoing datagrams, tunnel encapsulation occurs as a separate initial step, based on the routing table 12. Only afterwards is the resulting (tunneled) datagram processed by IPsec. Incoming datagrams are processed the other way round. By that means, IPsec is claimed to be compatible with dynamic routing.

An interpretation of this solution, based on the aforementioned way of fitting IPsec into the TCP/IP reference model, is depicted in FIG. 8. Each of the layers 3a, 1+2a, 3b and 1+2b (reference signs 81, 82, 83, 84, 73, 74, 75, 76) is passed through twice. It is the same layer each time, only the point in time when the layer is passed through for the first time and second time differs. In FIG. 8, the two different points in time are distinguished by a single apostrophe or no apostrophe after the layer number.

IIPtran's architecture enforces that before an outgoing datagram is processed by IPsec, it mandatorily passes through layer 3b' (83) first, where it is encapsulated into an IPIP tunnel based on the dynamically learned reachability information. This is achieved by leaving the datagram unmodified during the first pass through layers 3a' (81) and 1+2a' (82). The SPD is configured in such a way that these two layers are effectively skipped during the first pass. It is not until the second pass of the layers 3a (73) and 1+2a (74) that the datagram actually is processed by IPsec.

A disadvantage of IIPtran is that the access control which is integral to IPsec can no longer be used: At the point in time when the access control is applied to an incoming or outgoing datagram by means of the SPD, i.e. at layer 3a (73), the datagram is encapsulated within the IPIP tunnel. The access control can therefore only be applied to the outer IP header (the one of the tunnel), but not to the inner IP header (the one of the datagram).

It is possible to alternatively apply the access control at layer 3b' (83) by means of a conventional IP packet filter, but then the problem arises that at this point in time, it is no longer known over which Security Association (SA) an incoming datagram was received. Thus, the access control at layer 3b' (83) can only be applied globally to all IIPtran tunnels, not differently for each IIPtran tunnel. This is a security hole: A data processing apparatus can send a datagram with a forged sender address over an IIPtran tunnel to a second data processing apparatus, if the second data processing apparatus is able to reach over one of its IIPtran tunnels the data processing apparatus to which this sender address actually belongs ("IP spoofing"). In principle, it is possible to save the information over which SA an incoming datagram was received and make it available at layer 3b' (83), but this is not required by the standards. In addition, some operating systems offer no IP packet filter at all at layer 3b' (83), or they offer no packet filter with equally powerful matching functions as the SPD.

In an updated version of RFC 2401 (RFC 4301, http://www.ietf.org/rfc/rfc4301.txt), IIPtran is mentioned together with the following warning: "The access control functions that are an important part of IPsec are significantly limited [with IIPtran], as they cannot be applied to the end-to-end headers of the packets that traverse a transport-mode SA used in this fashion. Thus this way of using transport-mode should be evaluated carefully before being employed in a specific context."

Another disadvantage of IIPtran occurs when multiple IIPtran tunnels need to be configured between two data processing apparatuses. This may e.g. be necessary when the data traffic sent over each of the tunnels is afforded a different quality of service ("Differentiated Services"). IIPtran requires an additional IP address on both endpoints for each of the tunnels, thereby limiting the scalability. In contrast to this, IPsec tunnel-mode does not require additional IP addresses when multiple SAs are configured between two data processing apparatuses.

In a newer version of the IIPtran specification (RFC 3884, http://www.ietf.org/rfc/rfc3884.txt, published on 28 Sep. 2004), in section 4, three alternative attempts to solve the incompatibility between IPsec and dynamic routing are presented together with their individual disadvantages.

A disadvantage of IIPtran and all three alternative solution attempts is that they modify the processing of datagrams (FIG. 7) more or less substantially: IIPtran requires passing through layers 3a, 1+2a, 3b and 1+2b (73, 74, 75, 76) twice. The "Alternative 1" requires changing IPsec so that the SAs of layer 3a and 1+2a (73, 74) are made available as virtual network interfaces at layer 3b (75). The "Alternative 3" requires changing the routing mechanism at layer 3b (75) so that it consults the SAD of layer 3a and 1+2a (73, 74). The "Alternative 2" is impracticable according to section 4.2.1 of the IIPtran specification.

These modifications make the processing of datagrams more complicated and non-transparent. As the probability that a system contains a security vulnerability grows proportionally to the system's complexity, these modifications increase the risk that implementations are affected by security defects. At the same time, it becomes more difficult for security professionals to analyze the protocol and its implementations for security defects.

Another disadvantage of IIPtran is finally that passing through layers 3a, 1+2a, 3b and 1+2b (73, 74, 75, 76) twice reduces the performance.

It is one object of the present invention to establish compatibility between IPsec and dynamic routing without adversely affecting the access control which is integral to IPsec.

This object is achieved by the teachings of the independent claims.

Preferred embodiments of the invention are the subject matter of the dependent claims.

It is one advantage of the present invention that it does not require additional IP addresses when multiple IPsec tunnels need to be configured between two data processing apparatuses. It is a further advantage of the invention that it does not require modifications to the processing of datagrams.

BRIEF DESCRIPTION OF THE DRAWINGS

Preferred embodiments of the invention will now be described more fully hereinafter with reference to the accompanying drawings, which show:

FIG. 2 an outbound SPD;
FIG. 3 an inbound SPD;
FIG. 5 a routing daemon's routing table;
FIG. 6 a redundant VPN comprising company headquarters and a branch office;
FIG. 7 a layer model of IPsec;
FIG. 8 a layer model of IIPtran.

DETAILED DESCRIPTION OF THE INVENTION

Figure 1:
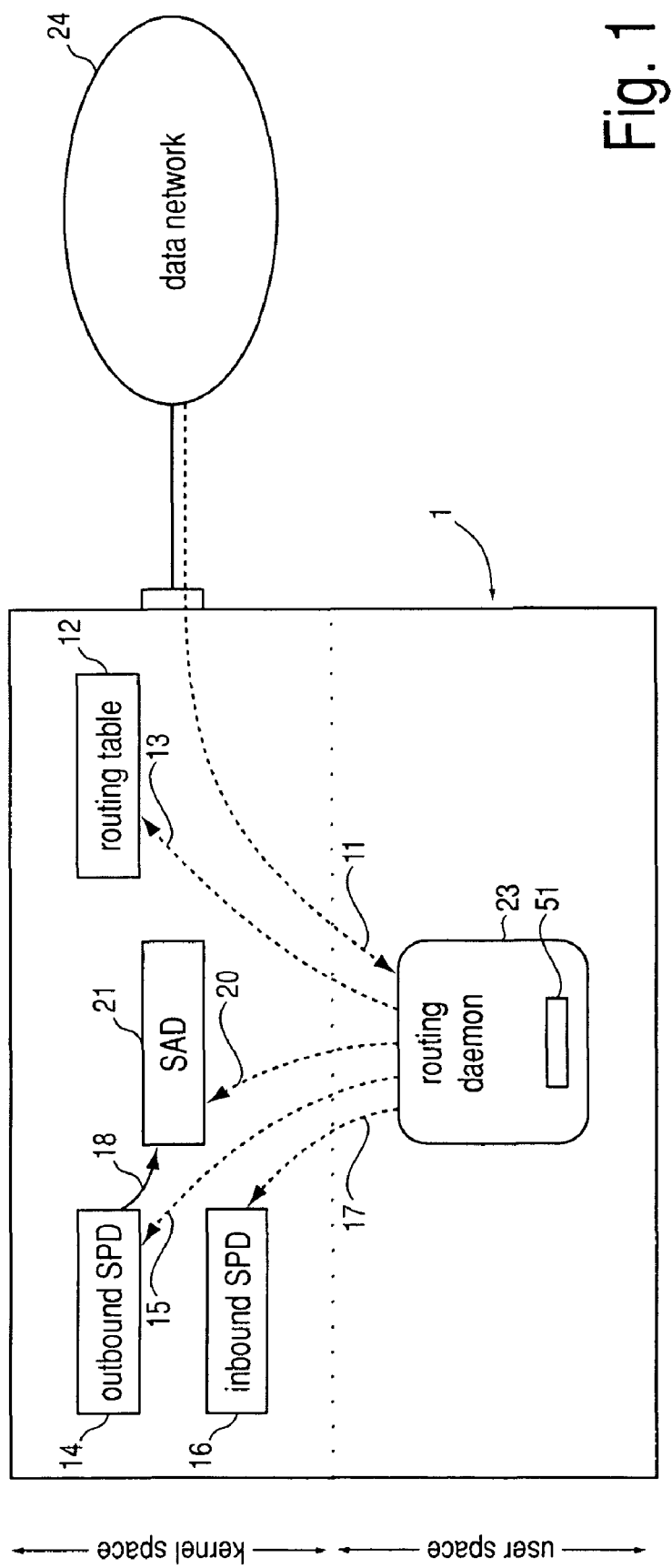
FIG. 1 a schematic illustration of a data processing apparatus in accordance with the invention.
Figure 4:
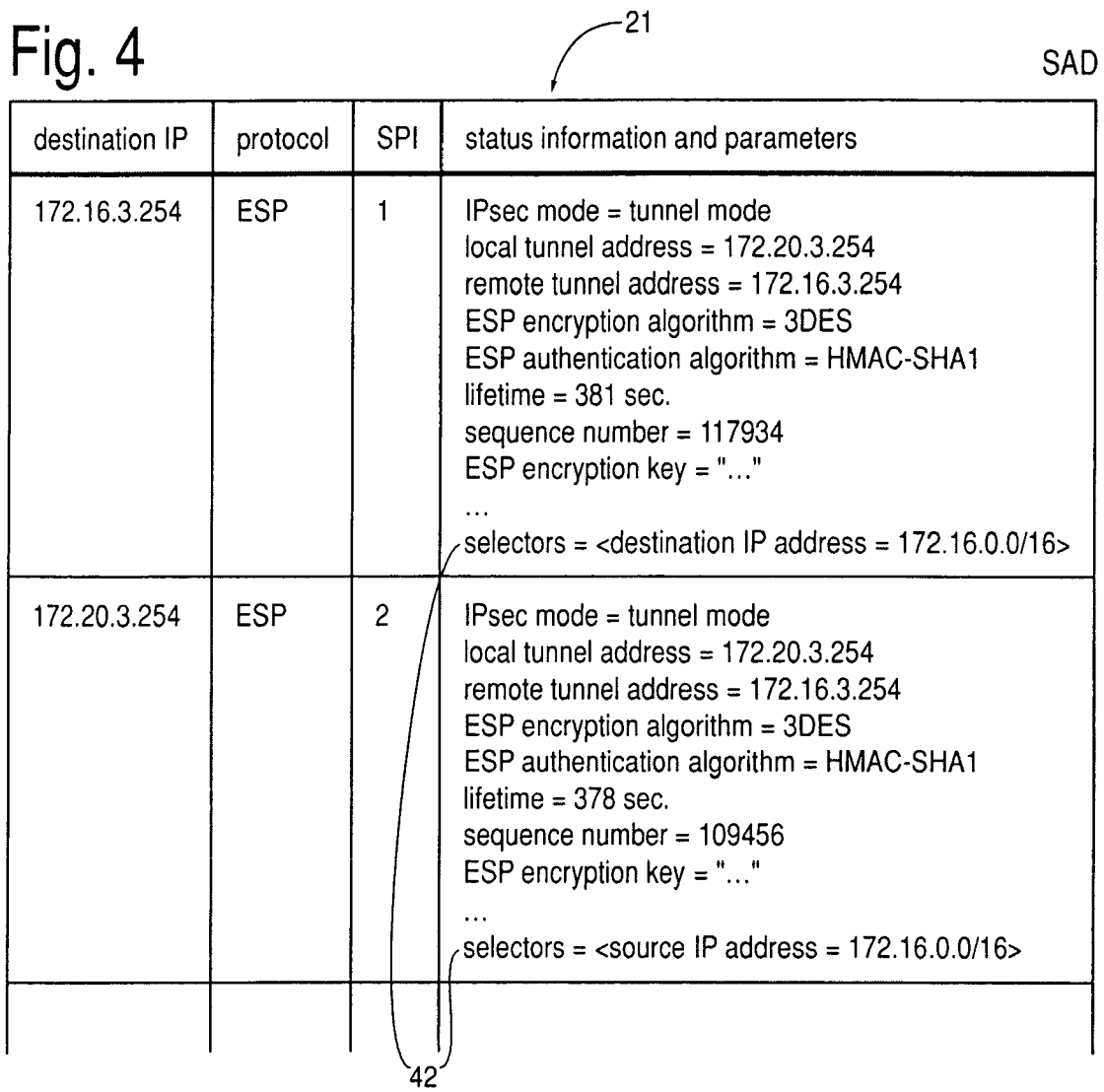
FIG. 4 an SAD.

Underlying the invention is the insight that the IPsec data structure SPD bears similarities to a routing table.

An entry in a routing table 51 (FIG. 5) consists of a "destination" 52, i.e. a network destination address, of a "gateway" or "next hop" 53, i.e. the network address of the data processing apparatus to which datagrams with said network destination address are to be forwarded, and of other parameters as appropriate, like e.g. a metric 54 which, should there be multiple routing table entries with the same network destination address, allows for ranking of these entries so that the best entry can be used.

An entry in an outbound SPD 14 (FIG. 2) consists of one or more "selectors" and an "action". A "selector" specifies the value of a certain header field in an outgoing datagram. The "action" specifies how a datagram is to be processed if it matches all of the SPD entry's "selectors": Drop the datagram ("discard"), pass it through as cleartext ("bypass"), or have IPsec process it ("protect"). In the latter case, the SPD entry contains an SA specification, listing e.g. the algorithms which are to be applied to the datagram. For a tunnel-mode SA, this specification contains the IP address of the other tunnel endpoint (as per RFC 4301, section 4.4.1.2).

An entry in a routing table 51 has the same semantics as an entry in an outbound SPD 14 which has a selector of type "destination IP address" with a network destination address 52, and which has the action "protect" with a tunnel-mode SA specification, where this SA specification defines the gateway 53 as the IP address of the other tunnel endpoint.

Thus, an IPsec-capable data processing apparatus possesses two routing tables: Firstly, the outbound SPD 14 at layer 3a (73), and secondly, the normal routing table 12 at layer 3b (75). By means of IPsec's SAs, an overlay network is created. To realize an overlay network, an additional routing table is required unless the address spaces of the overlay and the base network are disjunct. IIPtran employs disjunct address spaces. As the outbound SPD 14 is also capable of discarding datagrams, it constitutes a combination of a routing table with an IP packet filter. The inbound SPD 16 has no routing function, it only serves as an IP packet filter for incoming datagrams.

The layers 3a. 1+2a and 3b (73, 74, 75) are not layers in the proper sense, but rather processing steps within layer 3. They are shown as layers in FIG. 7 to emphasize the parallel between layer 3a (73) and layer 3b (75) (outbound SPD 14 versus normal routing table 12), and between layer 1+2a (74) and layer 1+2b (76) (SAs as virtual network interfaces versus physical network interfaces). An IPsec-capable data processing apparatus performs for each incoming and outgoing datagram the processing steps 3a, 1+2a and 3b (73, 74, 75) in that order within layer 3. A non-IPsec-capable data processing apparatus performs only the processing step 3b (75) within layer 3.

The layers 3a, 1+2a and 3b (73, 74, 75) are not layers in the proper sense, but rather processing steps within layer 3. They are shown as layers in FIG. 7 to emphasize the parallel between layer 3a (73) and layer 3b (75) (outbound SPD 14 versus normal routing table 12), and between layer 1+2a (74) and layer 1+2b (76) (SAs as virtual network interfaces versus physical network interfaces). An IPsec-capable data processing apparatus performs for each incoming and outgoing datagram the processing steps 3a, 1+2a and 3b (73, 74, 75) in that order within layer 3. A non-IPsec-capable data processing apparatus performs only the processing step 3b (75) within layer 3.

In this patent, the term "reachability information" denotes a data record which includes at least the following elements: A network destination address 52, a gateway 53, and an indication whether the network destination address 52 is newly reachable (route advertisement) or no longer reachable (route withdrawal) via the gateway 53. Some dynamic routing protocols do not explicitly specify the gateway 53 in a reachability information. Instead, the data processing apparatus which sent the reachability information is implicitly assumed as the gateway 53.

Dynamic routing requires that a data processing apparatus sends, temporally closely related to every change of the network topology, a corresponding reachability information to its neighbouring data processing apparatuses.

The "Border Gateway Protocol" specifies that a data processing apparatus periodically sends a signal of liveness to its neighbouring data processing apparatuses ("KeepAlive" message). The absence of KeepAlive messages from a data processing apparatus for a certain period of time is interpreted as an outage, and all routes that have been advertised by this data processing apparatus are considered withdrawn. Thus, the absence of KeepAlive messages has the same effect as if the data processing apparatus had sent reachability information to withdraw all its routes. Whenever it is said in this patent that a data processing apparatus receives a reachability information, this includes such an implicit withdrawal of routes.

The "Routing Information Protocol" (RIP, RFC 2453, http://www.ietf.org/rfc/rfc2453.txt) specifies that instead of explicitly sending a reachability information upon every change of the network topology, a data processing apparatus periodically advertises all network destination addresses that are currently reachable through it. Adding reachability information happens implicitly: The newly advertised network destination addresses can be identified by comparison with the preceding advertisement. Withdrawing routes happens implicitly as well: Advertised network destination addresses are assigned a lifetime by a receiving data processing apparatus, and they are implicitly considered withdrawn if they are not readvertised to the data processing apparatus prior to the expiration of the lifetime. The periodic advertisements function as KeepAlive messages: When a neighbouring data processing apparatus fails, all network destination addresses that were advertised by it are considered withdrawn after expiration of their lifetime. Whenever it is said in this patent that a data processing apparatus receives a reachability information, this includes an implicit advertisement or withdrawal of routes such as in RIP.

In one embodiment of the invention, IPsec-capable data processing apparatuses communicate with each other over the IPsec tunnels by means of a dynamic routing protocol. A data processing apparatus informs the data processing apparatuses that it has established IPsec tunnels with which network addresses are currently reachable through it. For this, it uses the dynamic routing protocol over these IPsec tunnels. Alternatively to the direct communication of reachability information between two data processing apparatuses which have established an IPsec tunnel, this reachability information may also be communicated indirectly via a third data processing apparatus ("Route Reflection", RFC 2796, http://www.ietf.org/rfc/rfc2796.txt). E.g., in FIG. 6, the first data processing apparatus 63 may receive reachability information which pertains to the IPsec tunnel 64 established with the second data processing apparatus 61 from the third data processing apparatus 600. As regards the invention, it is irrelevant whether the communication happens directly or indirectly. What is relevant is that upon every change of the network topology, a corresponding reachability information is communicated to the affected data processing apparatuses in a timely manner.

A data processing apparatus 1 which receives a reachability information 11 in this way incorporates it not into the normal routing table 12, but into the IPsec data structures outbound SPD 14, inbound SPD 16 and SAD 21. If the reachability information advertises a new route, the data processing apparatus 1 performs the following steps:

(a) The data processing apparatus 1 inserts 15 an entry into its outbound SPD 14 which has a selector of type "destination IP address" with the network destination address of the reachability information 11, and which has the action "protect" with a tunnel-mode SA specification, where this SA specification defines the gateway of the reachability information 11 as the IP address of the other tunnel endpoint. The other parameters of the SA specification, e.g. the cryptographic algorithms IPsec is to apply, may be advertised as part of the reachability information 11, or they may be preconfigured locally on the data processing apparatus 1. The same applies for the position in the outbound SPD 14 at which the entry is inserted 15. (The entries in the outbound SPD 14 are ordered.)

(b) RFC 2401 mandates that if SAs have been established for an entry in the outbound SPD 14, the entry must contain pointers 18 ("links") to the SAD entries of these SAs. The data processing apparatus 1 therefore adds these pointers 18 to the newly inserted entry in the outbound SPD 14 if matching SAs have already been established. If the outbound SPD 14 is configured in such a way that only a single SA is established with the data processing apparatus specified as the gateway in the reachability information 11, then it suffices to search 20 the SAD 21 for a tunnel-mode SA which uses the gateway of the reachability information 11 as the IP address of the other tunnel endpoint. If on the other hand the outbound SPD 14 is configured in such a way that multiple SAs can exist to the data processing apparatus specified as the gateway in the reachability information 11, then it may not be possible to determine automatically how the pointers 18 have to be set. This can be solved by advertising as part of the reachability information 11 to which SAs it pertains, e.g. by advertising the "Security Parameter Indexes" (SPIs), or by preconfiguring this locally on the data processing apparatus 1.

(c) In order to open up the return path, the data processing apparatus 1 inserts 17 an entry into the inbound SPD 16 which has a selector of type "source IP address" with the network destination address of the reachability information 11, and which has the action "protect" with a tunnel-mode SA specification, where this SA specification defines the gateway of the reachability information 11 as the IP address of the other tunnel endpoint. Regarding the other parameters of the SA specification and the position of the newly inserted 17 entry in the inbound SPD 16, the same remark applies as in step (a).

(d) RFC 2401 mandates: "For each of the selectors defined in Section 4.4.2, [an] SA entry in the SAD must contain the value or values which were negotiated at the time the SA was created." Therefore, if matching SAs have already been established for the entry that was newly inserted 15, 17 into the outbound SPD 14 or inbound SPD 16, the data processing apparatus 1 adds 20 the selector 42 that was inserted into the outbound SPD 14 or inbound SPD 16 in step (a) or step (c), to the SAD entries of these SAs. To do so, the data processing apparatus 1 first has to search 20 the SAD 21 for matching SAs. Here, the same remarks apply as in step (b).

With IPsec implementations that are not fully standard conformant, it may not be necessary to perform all of these steps.

RFC 2401 mandates that a data processing apparatus keeps a separate SPD for each network interface. In RFC 4301, this is optional. If this functionality is used, the appropriate SPD has to be identified first, based on the gateway of the reachability information 11, before performing the above-described steps.

In RFC 4301, the data structures SPD and SAD were modified. This results in the following changes to step (a) to (d): As the outbound SPD 14 and inbound SPD 16 were combined into a single data structure SPD, the data processing apparatus 1 inserts an entry into the SPD instead of the outbound SPD 14 in step (a), and step (c) is omitted. In step (d), the data processing apparatus 1 adds 20 only to the SAD entries of matching inbound SAs, not to those of matching outbound SAs. Additionally, the data processing apparatus 1 inserts an entry into the data structure "SPD-S Cache" in step (d) which contains a selector analogous to the one of step (a). The pointer of step (b) is not added to the newly inserted entry in the SPD by the data processing apparatus 1, but to the newly inserted entry in the SPD-S Cache.

In RFC 4301, the definition of SPD entries was also revised: "Each SPD entry now consists of 1 to N sets of selectors, where each selector set contains one protocol, and a 'list of ranges' can now be specified for the 'local IP address' [and] 'remote IP address'." This functionality makes it possible that the data processing apparatus 1 does not insert a new entry into the SPD in step (a), but instead inserts the network destination address of the reachability information 11 into an existing entry in the SPD which has the action "protect" with a tunnel-mode SA specification, where this SA specification defines the gateway of the reachability information 11 as the IP address of the other tunnel endpoint. By that means, all reachability information pertaining to a specific IPsec tunnel can be stored in a single SPD entry. This applies analogously to the entry that the data processing apparatus 1 inserts into the SPD-S Cache in step (d). It should be noted that in RFC 4301, the terms "destination IP address" and "source IP address" were replaced by "remote IP address" and "local IP address".

In this patent, the invention and its preferred embodiments are described based on RFC 2401, but they can be employed with RFC 4301 as well if the aforementioned changes to step (a) to (d) are considered.

If the data processing apparatus 1 receives a reachability information 11 which withdraws a route, the data processing apparatus 1 undoes the steps performed earlier: It removes 15 the entry from the outbound SPD 14 (step (a)) together with its pointers 18 into the SAD 21 (step (b)), it removes 17 the entry from the inbound SPD 16 (step (c)), and it removes 20 the selector from the SAD entries of the matching SAs (step (d)).

In one embodiment of the invention, the security is enhanced by having the data processing apparatus 1 accept incoming datagrams over an IPsec tunnel to a second data processing apparatus only if they are destined for a network destination address that the data processing apparatus 1 has previously advertised to the second data processing apparatus. To achieve this, step (c) is changed so that for each network destination address that the data processing apparatus 1 has advertised to the second data processing apparatus so far, it inserts 17 an entry into the inbound SPD 16 which contains, additionally to the selector of type "source IP address" with the network destination address of the reachability information 11, a selector of type "destination IP address" with the network destination address that was advertised to the second data processing apparatus. Consequently, just as many entries are inserted 17 into the inbound SPD 16 in step (c) as network destination addresses have been advertised to the second data processing apparatus so far. When the data processing apparatus 1 advertises a network destination address to the second data processing apparatus, it has to insert 17 an entry into the inbound SPD 16 for each network destination address that it has received from the second data processing apparatus so far, the entry containing a selector of type "destination IP address" with the newly advertised network destination address, and a selector of type "source IP address" with the network destination address that the second data processing apparatus has advertised. Furthermore, the SAD 21 has to be updated as described in step (d).

Analogously, the data processing apparatus 1 may permit outgoing datagrams over an IPsec tunnel to a second data processing apparatus only if they have a network source address that the data processing apparatus 1 has previously advertised to the second data processing apparatus. To achieve this, one has to follow the instructions described in the preceding paragraph, replacing "step (c)" by "step (a)", "inbound SPD 16" by "outbound SPD 14", "destination IP address" by "source IP address", and "source IP address" by "destination IP address".

In another embodiment, the security is enhanced by having a data processing apparatus cryptographically sign the reachability information 11 that it sends to other data processing apparatuses, thereby allowing for verification of the data origin's authenticity by the receiving data processing apparatuses and preventing forging of the reachability information 11.

In another embodiment, when the data processing apparatus 1 receives the same network destination address from multiple data processing apparatuses, it keeps all of this reachability information 11 in memory. The data processing apparatus 1 ranks the reachability information 11 and it always inserts 15, 17, 20 the best route into the outbound SPD 14, inbound SPD 16 and SAD 21. If this route is withdrawn, the best one is chosen from the remaining reachability information 11 and inserted 15, 17, 20 into the outbound SPD 14, inbound SPD 16 and SAD 21, replacing the previous route. To rank the reachability information 11, a metric is used which is advertised as part of the reachability information 11 or preconfigured locally on the data processing apparatus 1.

In another embodiment, the security is enhanced by having the data processing apparatus 1 filter the reachability information 11 that it receives from other data processing apparatuses using locally preconfigured filter lists before it inserts 15, 17, 20 it into the outbound SPD 14, inbound SPD 16 and SAD 21. These data processing apparatuses are frequently under the control of other administrators, so the reachability information they advertise cannot be fully trusted. Analogously, the data processing apparatus 1 may filter the reachability information that it sends to other data processing apparatuses using locally preconfigured filter lists.

In another embodiment, the data processing apparatus 1 is capable of changing the parameters of the reachability information that it receives from or that it sends to other data processing apparatuses using locally preconfigured rules. E.g., the data processing apparatus 1 may modify the metric of reachability information 11 that it receives, so that for certain network destination addresses, the path via a specific other data processing apparatus is always preferred, even if this data processing apparatus advertises its reachability information 11 with an inferior metric.

Hereinafter, the term "overlay reachability information" denotes a reachability information containing a network destination address that the data processing apparatus receiving this reachability information can reach over one of its IPsec tunnels. The term "base reachability information" denotes a reachability information containing a network destination address that the receiving data processing apparatus can reach over the base network. The term "dynamic routing in the overlay network" refers to the receiving and sending of overlay reachability information, while "dynamic routing in the base network" analogously refers to the receiving and sending of base reachability information.

In one embodiment of the invention, the data processing apparatus 1 propagates overlay reachability information 11 to other data processing apparatuses within the scope of the dynamic routing in the overlay network.

In another embodiment of the invention, the data processing apparatus 1 redistributes overlay reachability information into the dynamic routing in the base network, and base reachability information into the dynamic routing in the overlay network. An application example is shown in FIG. 6: It is assumed that the company headquarters' 68 internal network is a vast, complex network, and that a dynamic routing protocol is employed within this network. The company headquarters' two security gateways 61, 62 participate in this interior routing protocol. They receive base reachability information via the interior routing protocol and propagate it to the security gateway 63 in the company branch office (redistribution into the dynamic routing in the overlay network). They conversely receive overlay reachability information from the security gateway 63 and propagate it into the interior routing protocol (redistribution into the dynamic routing in the base network). When an outage occurs within the company headquarters' 68 internal network which splits the internal network into two disjunct parts, then from the viewpoint of the security gateway 63, one part of the internal network is only reachable over the IPsec tunnel 64 to security gateway 61, and the other part is only reachable over the IPsec tunnel 65 to security gateway 62. Because of the redistribution into the dynamic routing in the overlay network, the security gateway 63 in the branch office has precise information which part of the company headquarters' 68 internal network can be reached over which tunnel 64, 65. At the same time, because of the redistribution into the dynamic routing in the base network, data processing apparatuses located in the company headquarters' 68 internal network have precise information via which security gateway 61, 62 they can still reach the company branch office 69.

The dynamic routing in the overlay network may be implemented in one of two ways: By using a conventional routing protocol like BGP, or by using a new routing protocol tailored to IPsec.

An embodiment of the invention which employs a conventional routing protocol for the dynamic routing in the overlay network is depicted in FIG. 1. The routing protocol is implemented by the routing daemon 23.

A routing daemon 23 in accordance with the invention has to distinguish whether a reachability information 11 that it has received is a base reachability information or an overlay reachability information. The distinction can be made by using different routing protocols, e.g. BGP for the dynamic routing in the base network and RIP for the dynamic routing in the overlay network. Alternatively, the distinction can be made by advertising as part of the reachability information 11 whether it is a base reachability information or an overlay reachability information. This can e.g. be implemented with the multiprotocol extensions for BGP (RFC 2858, http://www.ietf.org/rfc/rfc2858.txt). They allow for labeling of the overlay reachability information by means of the "Subsequent Address Family Identifier". And lastly, the distinction can be made by preconfiguring locally on the data processing apparatus 1 whether a reachability information 11 is to be interpreted as a base reachability information or as an overlay reachability information, e.g. by manually defining a list of network destination addresses or gateways. A reachability information 11 would then be interpreted as an overlay reachability information if its network destination address or gateway is included in the list.

A routing daemon 23 in accordance with the invention has to incorporate 15, 17, 20 overlay reachability information 11 into the IPsec data structures outbound SPD 14, inbound SPD 16 and SAD 21. Typically, a routing daemon 23 contains a routine which is responsible for inserting 13 routes into the normal routing table 12. One may build a branch into this routine so that overlay reachability information 11 is instead inserted 15, 17, 20 into the IPsec data structures 14, 16, 21. Another branch is analogously added to the routine which is responsible for removing 13 routes from the normal routing table 12.

For the incorporation 15, 17, 20 into the IPsec data structures 14, 16, 21, the "PF_KEY" programming interface may be used (RFC 2367, http://www.ietf.org/rfc/rfc2367.txt; see also the extensions presented in the Internet publication http://www.kame.net/newsletter/20021210/). To insert 15, 17 data into the outbound SPD 14 and inbound SPD 16 according to step (a) and step (c), the routing daemon sends a message of type "SADB_X_SPDADD" to the kernel. Figuratively, in doing this, a route is converted to an IPsec policy. To later on remove 15, 17 the entries from the outbound SPD 14 and inbound SPD 16, a message of type "SADB_X_SPDDELETE" is sent. To search 20 the SAD 21 in step (b), a message of type "SADB_DUMP" may be used. This will return all Security Associations stored in the SAD 21, and one has to search through them for the matching SA. If the SA identified in step (b) upon insertion 15, 17, 20 of a reachability information 11 is remembered, then later on upon removal 15, 17, 20 of the reachability information 11, the searching 20 of the SAD 21 can be omitted. Storing selectors in SAD entries according to step (d) is not provided for by the PF_KEY specification and is usually not supported by IPsec implementations employing PF_KEY. With such implementations, step (d) can be omitted.

If a conventional routing protocol is employed for the dynamic routing in the overlay network, it may not be possible to configure multiple IPsec tunnels between two data processing apparatuses because conventional routing protocols generally do not provide for advertising as part of a reachability information 11 to which SAs it pertains. Without such a functionality, it may not be possible to determine the appropriate SAs in step (b) and (d).

An embodiment of the invention which employs a new routing protocol tailored to IPsec for the dynamic routing in the overlay network can eliminate this disadvantage, e.g. by advertising the "Security Parameter Indexes" (SPIs) of the appropriate SAs as part of a reachability information 11. This has the additional advantage that the incorporation 15, 17, 20 of reachability information 11 into the IPsec data structures 14, 16, 21 is sped up because the searching 20 of the SAD 21 in step (b) and step (d) can be omitted. Moreover, with such a specialized routing protocol it would be possible to advertise not just a network destination address in a reachability information 11, but selectors. E.g., a data processing apparatus could advertise that a first port of a second data processing apparatus is reachable over a first SA, and that a second port of the second data processing apparatus is reachable over a second SA. Thus, this would allow for the communication of substantially more complex and finer grained reachability information than with a conventional routing protocol.

It makes sense to integrate this specialized routing protocol into the data processing program implementing the IKE protocol ("Internet Key Exchange", RFC 2409, http://www.ietf.org/rfc/rfc2409.txt). This is particularly advantageous when two data processing apparatuses which have established an IPsec tunnel between each other exchange reachability information directly, i.e. without involvement of third data processing apparatuses (e.g. "Route Reflection", see above), because the management of the IPsec tunnel requires that they communicate via the IKE protocol anyway. A further advantage is that the data processing program implementing the IKE protocol, henceforth called IKE daemon, is inherently able to access 15, 17, 20 the IPsec data structures 14, 16, 21, as it already possesses an interface to the kernel to manage the IPsec tunnels, e.g. PF_KEY.

Redistribution of overlay reachability information into the dynamic routing in the base network, and redistribution of base reachability information into the dynamic routing in the overlay network is possible if an IKE daemon in accordance with the invention possesses an interface to a routing daemon. The IKE daemon can then propagate overlay reachability information to the routing daemon, and the routing daemon can conversely propagate base reachability information to the IKE daemon. One may choose whether the incorporation 15, 17, 20 of overlay reachability information into the IPsec data structures 14, 16, 21 is handled by the routing daemon or by the IKE daemon.

In an updated version of the IKE specification (IKEv2, http://www.ielf.org/proceedings/03mar/-D/draft-ietf-ipsec-ikev2-05.txt, published on 24 Feb. 2003), the "Traffic Selector Negotiation" functionality is introduced. It allows two data processing apparatuses to negotiate upon establishment of an IPsec tunnel which datagrams may be sent over the IPsec tunnel. To do this, the two data processing apparatuses send each other selectors from their SPD which pertain to the IPsec tunnel. The data processing apparatus which initiated the establishment of the IPsec tunnel (henceforth called "initiator") sends a list of network source addresses and a list of network destination addresses to the other data processing apparatus (henceforth called "responder"). The responder may reduce, i.e. further restrict the two lists, before sending them back.

This functionality can in principle be employed to have the two data processing apparatuses communicate to each other all the network destination addresses that are reachable through them, similarly to a dynamic routing protocol. To achieve this, the initiator sends as the network source addresses all the network addresses that are reachable through it, and as the network destination addresses it sends the selector "ANY". The responder sends this data back to the initiator, replacing the "ANY" by all the network addresses that are reachable through it. It should be noted that this does not result in dynamic routing yet. Dynamic routing requires that upon every change of the network topology, a reachability information is sent in a timely manner. However, the Traffic Selector Negotiation takes place only once upon establishment of IPsec tunnels, so changes to the network topology which occur after establishment of the IPsec tunnels are not communicated via the Traffic Selector Negotiation. Moreover, it is unclear how a data processing apparatus learns which network addresses are currently reachable through it. This requires e.g. an integration of the data processing apparatus into the dynamic routing in the base network. The IKEv2 specification does not provide information on this topic, the Traffic Selector Negotiation is described there merely for the single purpose of allowing that upon establishment of an IPsec tunnel, the data processing apparatuses negotiate which datagrams may be sent over it.

Hereinafter, three possible ways are described to use IKEv2's Traffic Selector Negotiation for the originally unintended purpose of dynamic routing. It is assumed that the IKEv2 daemon is always in possession of current information as to which network addresses are reachable through it. This may e.g. be realized by means of an interface to a routing daemon as explained above.

The first way is to shut down and then reestablish upon every change of the network topology (and thus of the own SPD) the affected SAs (i.e. those SAs over which the newly reachable or no longer reachable network destination address was previously advertised or would be advertised), i.e. to perform "rekeying" of these SAs as per the IKEv2 specification. In the course of this, a Traffic Selector Negotiation is carried out according to the IKEv2 specification. This solution has the advantage that the IKEv2 protocol need not be changed at all. Its disadvantage is the significant overhead caused by the frequent rekeying of SAs and the resulting poor scalability. This poses the risk that route flaps lead to a denial of service condition of the data processing apparatus, as all CPU time or network bandwidth is consumed to negotiate new keys for SAs.

The second way is to extend the IKEv2 protocol by the capability to communicate reachability information without having to rekey. The extension may e.g. be realized by defining a new "Update TS Payload" (UTS). It consists of a "Generic Payload Header" followed by a "Protocol ID" (8 bits), an "SPI Size" (8 bits), a reserved field (18 bits) and two SPIs. The "INFORMATIONAL exchange" is redefined as follows (in keeping with the notation used in the IKEv2 specification):

HDR, SK {[N,] [D,] [CP,] [UTS TSi TSr,].-.-.} →
←HDR, SK {[N,] [D,] [CP], [UTS TSi TSr,] . . . }

An alternative to the definition of a new "Update TS Payload" is the extension of the "Notify Payload", e.g. as follows:

HDR, SK {N, TSi, TSr}. A new "Notify Message Type" needs to be defined for this. One SPI is already included in the Notify Payload, the second SPI has to be sent as the "Data" of the Notify Payload. The reason is that in addition to TSi and TSr, the two SPIs of the IPsec tunnel to which the Traffic Selectors pertain need to be communicated. Now upon every change of the network topology, the two data processing apparatuses have to initiate a Traffic Selector Negotiation in a timely manner by using the above-described "Update TS Payload" or "Notify Payload". The advantage of this solution is the smaller overhead compared to the aforementioned first solution. A disadvantage is the limited scalability: As every Traffic Selector Negotiation requires the communication of all network addresses which are reachable through the two data processing apparatuses, the bandwidth consumption may be high, and additionally, in very large networks the space available in an IKEv2 datagram will not suffice, possibly resulting in fragmentation of the IKEv2 datagram. One must bear in mind that the responder's message contains both, the entire set of network addresses on the initiator's side, and the entire set of network addresses on the responder's side; in contrast to this, in the initiator's message, TSr can consist of a single selector "0.0.0.0/0".

The third way is to extend the IKEv2 protocol so that upon every change of the network topology, only this change is advertised to the affected data processing apparatuses and not the entire set of network addresses. It should be noted that the IKEv2 protocol already features a functionality for the periodic sending of a signal of liveness between data processing apparatuses, so this functionality need not be duplicated in a dynamic routing protocol that is integrated into the IKE daemon.

Modern routing protocols offer the feature that if a network destination address is reachable via multiple gateways, instead of just using the best route, multiple routes are used in parallel, thus distributing the data traffic across these gateways (load sharing). This is called "equal cost multipath" in the case that multiple routes have the same metric, and "unequal cost multipath" if multiple routes with different metrics are available and the amount of data traffic sent via a route depends on its metric.

IPsec does not support such mechanisms so far, RFC 2401 makes no statement on this topic. An extension to the IPsec specification in accordance with the invention is therefore to allow that multiple SA specifications are stored within the "action" of an entry in the outbound SPD 14. In the simplest case, these SAs are used in a round-robin manner when sending out a datagram via this SPD entry, thereby achieving the "equal cost multipath" functionality. In another embodiment, the SA specifications are tagged with a metric and are used more or less frequently depending on their weight, thus implementing the "unequal cost multipath" functionality.

Finally, in another embodiment, IPsec tunnels are established dynamically, i.e. if they are not configured manually beforehand by an administrator. This occurs for instance when "opportunistic encryption" is used, wherein a security gateway tries to encrypt as much outgoing data traffic as possible by looking up in a directory for every outgoing datagram whether a security gateway exists via which the data processing apparatus that the datagram is ultimately destined for is reachable. Should the data processing apparatus even be reachable via multiple security gateways, it makes sense to establish an IPsec tunnel with all of these security gateways and then to mutually advertise data network addresses as described in this patent, because it is unknown in advance whether the data processing apparatus that the datagram is ultimately destined for is really reachable via every security gateway listed in the directory at this particular moment. For security gateways to which IPsec tunnels are established in this manner, it makes sense to look up the source address of the data traffic in the directory to discover which security gateways are responsible for this source address, and then to establish an IPsec tunnel with all of these security gateways. This ensures that data traffic which flows in the reverse direction, i.e. response data traffic, is always sent over the correct IPsec tunnel, which is particularly relevant in setups where one security gateway has a higher priority than a second security gateway. Security gateways initiating an IPsec tunnel for opportunistic encryption may communicate the source address of the data traffic to be transmitted to the responding security gateway.[1] Alternatively, the responding security gateway may perform lookups for the data network addresses that are advertised to it in the directory and then establish IPsec tunnels to some or all of the security gateways found.[2] Lookups in the directory may be supplemented with a cache memory, with the information in the cache memory being preferably invalidated and thus no longer used after a specific period of time; lookups in the directory which returned no security gateways at all for a given data network address may be cached as well (negative caching).[3] Lookups in the directory may be performed for a data network address which subsumes the network address of the data processing apparatus that the datagram is ultimately destined for and such information may also be cached; information in the cache memory may be invalidated upon an outage or a proper shutdown of an IPsec tunnel.[4] The lookup in the directory and the establishing of IPsec tunnels may be skipped by checking first whether at least one IPsec tunnel is already established to a security gateway via which the data processing apparatus that the datagram is ultimately destined for is reachable.[5] As directory, for instance the Domain Name System (DNS), and/or the Network Information System, and/or an LDAP directory, and/or a database may be used.[6] If an outage of an IPsec tunnel occurs or if already the establishment of an IPsec tunnel fails, establishment of the IPsec tunnel may be tried again in fixed or variable intervals.[7] Establishing the IPsec tunnel may optionally be tried only as long as data traffic actually needs to be sent over it, for instance by remembering the last occurrence when data traffic would have been sent over the IPsec tunnel, and by ceasing attempts to establish the IPsec tunnel if an adequate period of time has passed since this point in time.[8] An IPsec tunnel may be shut down if no data traffic was sent over it for a certain period of time, for instance by remembering the last occurrence when data traffic was sent over the IPsec tunnel, and by shutting it down if an adequate period of time has passed since this point in time; the IPsec tunnel may be reestablished later when data traffic needs to be sent over it again.[9]

[1] [0096-0098], "Embodiment 3"
[2] [0099-0101], "Embodiment 4"
[3] [0102-0104], "Embodiment 5"
[4] [0105-0109], "Embodiment 6"
[5] [0090-0095], "Embodiment 2"
[6] [0110], "Embodiment 7"
[7] [0112], "Embodiment 9"
[8] [0113], "Embodiment 10"
[9] [0114], "Embodiment 11"

Illustratively, data processing apparatuses can be computers, laptops, PDAs, or UMTS cellular phones. These may be stationary and connected to a data network like the Internet by cable, or they may be connected wirelessly using IEEE 802.11, UMTS, GPRS, DECT or Bluetooth.

Although the present invention is described above with reference to preferred embodiments, it will be apparent to those skilled in the art that various changes and modifications can be made without departing from the spirit of the invention. Therefore, the scope of protection is defined by the appended claims and their equivalents.

LIST OF REFERENCE SIGNS 1 data processing apparatus
11 reachability information
12 operating system's routing table
13 insert or remove
14 outbound SPD
15 insert or remove
16 inbound SPD
17 insert or remove
18 pointer
20 search, insert or remove
21 SAD
23 routing daemon
24 data network
42 selector
51 routing table
52 destination
53 gateway
54 metric
600 packet filter
61, 62, 63 security gateway
64, 65 tunnel
66, 67 Internet connection
68 company headquarters
69 company branch office
71 layer 7
72 layer 4
73 layer 3a
74 layer 1+2a
75 layer 3b
76 layer 1+2b
81 layer 3a'
82 layer 1+2a'
83 layer 3b'
84 layer 1+2b'

The invention claimed is:

1. A method for a data network comprising:
storing a data structure (14) in a first data processing apparatus (1),
wherein the first data processing apparatus (1) and a plurality of second and third data processing apparatuses are connected to a data network (24),
wherein the data structure (14) accommodates a plurality of entries, wherein each entry comprises a plurality of selectors and a specification of a logical tunnel (64, 65) between the first data processing apparatus (1) and the second data processing apparatuses, and wherein a selector specifies values for certain header fields of a datagram,
processing each outgoing datagram by the first data processing apparatus (1), comprising:
searching the data structure (14) for an entry whose selectors match the datagram, for deciding (73) whether the datagram is sent over one of the logical tunnels (64, 65) defined by the data structure entry, and if so, over which one, afterwards deciding (75) to which second data processing apparatus in the data network (24) the datagram is sent,
sending a reachability information (11) by the third data processing apparatus to the first data processing apparatus (1) temporally related to every change of the network topology at the second data processing apparatus which is an endpoint of the logical tunnel (64, 65),
wherein said reachability information (11) comprises at least the following elements: a network destination address (52), a gateway (53), and an indication whether the network destination address (52) is newly reachable or no longer reachable via the gateway (53),
incorporating the reachability information (11) into the data structure (14) by the first data processing apparatus (1), comprising
inserting into (15) or removing from (15) the outbound SPD (14) an entry,
which has a selector for the header field of datagrams in which the network destination address of a datagram is stored, or more specifically a selector of type "destination IP address", with the network destination address (52) of the reachability information (11),
and which has the action "protect" with a specification of a logical tunnel (64, 65), or more specifically a tunnel-mode SA specification, wherein this SA specification specifies the gateway (53) of the reachability information (11) as the IP address of the other tunnel endpoint,
inserting into (17) or removing from (17) the inbound SPD (16) an entry,
which has a selector of type "source IP address" with the network destination address (52) of the reachability information (11),
and which has the action "protect" with a tunnel-mode SA specification, wherein this SA specification specifies the gateway (53) of the reachability information (11) as the IP address of the other tunnel endpoint.

2. A system comprising:
a first data processing apparatus (1), which includes a data structure (14) to accommodate a plurality of entries, wherein each entry is suited to accommodate a plurality of selectors and a specification of a logical tunnel (64, 65), and wherein a selector specifies values for certain header fields of a datagram,
a plurality of second and third data processing apparatuses,
a data network (24) to which the first data processing apparatus (1) and the second and third data processing apparatuses are connected, for establishing a plurality of logical tunnels (64, 65) between the first data processing apparatus (1) and the second data processing apparatuses,
wherein the first data processing apparatus (1) is suitably programmed to perform the following for each outgoing datagram:
searching the data structure (14) for an entry whose selectors match the datagram, for deciding (73) whether the datagram is sent over one of the logical tunnels (64, 65) defined by the data structure entry, and if so, over which one,
afterwards deciding (75) to which second data processing apparatus in the data network (24) the datagram is sent,
wherein the third data processing apparatuses are suitably programmed to send, temporally related to every change of the network topology at the second data processing apparatus which is an endpoint of the logical tunnel (64, 65), a corresponding reachability information (11) to the first data processing apparatus (1), said reachability information (11) comprising at least the following elements:

a network destination address (52),
a gateway (53),
and an indication whether the network destination address (52) is newly reachable or no longer reachable via the gateway (53),
wherein the first data processing apparatus (1) is suitably programmed to incorporate the reachability information (11) into the data structure (14), comprising
inserting into (15) or removing from (15) the outbound SPD (14) an entry,
which has a selector for the header field of datagrams in which the network destination address of a datagram is stored, or more specifically a selector of type "destination IP address", with the network destination address (52) of the reachability information (11),
and which has the action "protect" with a specification of a logical tunnel (64, 65), or more specifically a tunnel-mode SA specification, wherein this SA specification specifies the gateway (53) of the reachability information (11) as the IP address of the other tunnel endpoint,
inserting into (17) or removing from (17) the inbound SPD (16) an entry,
which has a selector of type "source IP address" with the network destination address (52) of the reachability information (11),
and which has the action "protect" with a tunnel-mode SA specification, wherein this SA specification specifies the gateway (53) of the reachability information (11) as the IP address of the other tunnel endpoint.

3. A system according to claim 2, wherein incorporating the reachability information (11) into the data structure (14) by the first data processing apparatus (1) further comprises
adding pointers (18) to the newly inserted entry in the outbound SPD (14) which point to entries in the SAD (21), or removing such a pointer (18),
wherein these entries correspond to the SA specification of the newly inserted (15) or removed (15) entry in the outbound SPD (14),
adding (20) a selector to entries in the SAD (21), or removing (20) a selector,
wherein the selector is of type "destination IP address" with the network destination address (52) of the reachability information (11),
and wherein these entries correspond to the SA specification of the newly inserted (15) or removed (15) entry in the outbound SPD (14),
adding (20) a selector to entries in the SAD (21), or removing (20) a selector,
wherein the selector is of type "source IP address" with the network destination address (52) of the reachability information (11),
and wherein these entries correspond to the SA specification of the newly inserted (17) or removed (17) entry in the inbound SPD (16).

4. A system comprising:
a first data processing apparatus (1), which includes a data structure (14) to accommodate a plurality of entries, wherein each entry is suited to accommodate a plurality of selectors and a specification of a logical tunnel (64, 65), and wherein a selector specifies values for certain header fields of a datagram,
a plurality of second and third data processing apparatuses,
a data network (24) to which the first data processing apparatus (1) and the second and third data processing apparatuses are connected, for establishing a plurality of logical tunnels (64, 65) between the first data processing apparatus (1) and the second data processing apparatuses,
wherein the first data processing apparatus (1) is suitably programmed to perform the following for each outgoing datagram:
searching the data structure (14) for an entry whose selectors match the datagram, for deciding (73) whether the datagram is sent over one of the logical tunnels (64, 65) defined by the data structure entry, and if so, over which one,
afterwards deciding (75) to which second data processing apparatus in the data network (24) the datagram is sent,
wherein the third data processing apparatuses are suitably programmed to send, temporally related to every change of the network topology at the second data processing apparatus which is an endpoint of the logical tunnel (64, 65), a corresponding reachability information (11) to the first data processing apparatus (1), said reachability information (11) comprising at least the following elements:
a network destination address (52),
a gateway (53),
and an indication whether the network destination address (52) is newly reachable or no longer reachable via the gateway (53),
wherein the first data processing apparatus (1) is suitably programmed to incorporate the reachability information (11) into the data structure (14), comprising
inserting into or removing from the SPD an entry,
which has a selector for the header field of datagrams in which the network destination address of a datagram is stored, or more specifically a selector that specifies the network destination address (52) of the reachability information (11) as a "remote IP address",
and which has the action "protect" with a specification of a logical tunnel (64, 65), or more specifically a tunnel-mode SA specification, wherein this SA specification specifies the gateway (53) of the reachability information (11) as the IP address of the other tunnel endpoint,
adding (20) a selector to entries in the SAD (21), or removing (20) a selector,
wherein the selector specifies the network destination address (52) of the reachability information (11) as the "remote IP address",
wherein these entries specify an incoming SA,
and wherein these entries correspond to the SA specification of the newly inserted or removed entry in the SPD,
inserting into or removing from the SPD-S Cache an entry,
which has a selector that specifies the network destination address (52) of the reachability information (11) as the "remote IP address",
adding pointers to the newly inserted entry in the SPD-S Cache which point to entries in the SAD (21), or removing such a pointer,
wherein these entries in the SAD (21) correspond to the SA specification of the newly inserted or removed entry in the SPD.

5. A system comprising:
a first data processing apparatus (1), which includes a data structure (14) to accommodate a plurality of entries, wherein each entry is suited to accommodate a plurality of selectors and a specification of a logical tunnel (64, 65), and wherein a selector specifies values for certain header fields of a datagram, a plurality of second and third data processing apparatuses, a data network (24) to which the first data processing apparatus (1) and the second and third data processing apparatuses are connected, for establishing a plurality of logical tunnels (64, 65) between the first data processing apparatus (1) and the second data processing apparatuses, wherein the first data processing apparatus (1) is suitably programmed to perform the following for each outgoing datagram:

searching the data structure (14) for an entry whose selectors match the datagram, for deciding (73) whether the datagram is sent over one of the logical tunnels (64, 65) defined by the data structure entry, and if so, over which one, afterwards deciding (75) to which second data processing apparatus in the data network (24) the datagram is sent, wherein the third data processing apparatuses are suitably programmed to send, temporally related to every change of the network topology at the second data processing apparatus which is an endpoint of the logical tunnel (64, 65), a corresponding reachability information (11) to the first data processing apparatus (1), said reachability information (11) comprising at least the following elements:

a network destination address (52), a gateway (53), and an indication whether the network destination address (52) is newly reachable or no longer reachable via the gateway (53), wherein the first data processing apparatus (1) is suitably programmed to incorporate the reachability information (11) into the data structure (14), comprising inserting into or removing from an entry in the SPD a selector, for the header field of datagrams in which the network destination address of a datagram is stored, or more specifically which specifies the network destination address (52) of the reachability information (11) as a "remote IP address", wherein the entry has the action "protect" with a specification of a logical tunnel (64, 65), or more specifically a tunnel-mode SA specification, wherein this SA specification specifies the gateway (53) of the reachability information (11) as the IP address of the other tunnel endpoint, adding (20) a selector to entries in the SAD (21), or removing (20) a selector, wherein the selector specifies the network destination address (52) of the reachability information (11) as the "remote IP address", wherein these entries specify an incoming SA, and wherein these entries correspond to the SA specification of the entry in the SPD into which a selector was newly inserted or removed, inserting into or removing from an entry in the SPD-S Cache a selector, which specifies the network destination address (52) of the reachability information (11) as the "remote IP address".

6. A system according to claim 2, wherein
the first data processing apparatus (1) is suitably programmed
to redistribute overlay reachability information into the dynamic routing in the base network, and to redistribute base reachability information into the dynamic routing in the overlay network.

7. A system according to claim 2, wherein
the first data processing apparatus (1) is suitably programmed
to send and to receive overlay reachability information by using a conventional dynamic routing protocol.

8. A system according to claim 2, wherein
the first data processing apparatus (1) is suitably programmed
to send and to receive overlay reachability information by using a dynamic routing protocol tailored to IPsec which is an extension of the IKE protocol.

9. A system according to claim 2, wherein
each entry in the data structure (14) is suited to accommodate a plurality of specifications of logical tunnels (64, 65), wherein each of these specifications has a metric,
and the first data processing apparatus (1) is suitably programmed
to send outgoing datagrams which are matched by the selectors of an entry in the data structure (14), wherein this entry comprises at least two specifications of logical tunnels (64, 65),
alternatingly over the tunnels (64, 65) defined by the specifications of the entry,
wherein the frequency with which datagrams are sent over one of the tunnels (64, 65) depends on the metric of this tunnel (64, 65).

10. A non-transitory storage medium which can communicate with a data processing apparatus for the purpose of data exchange, wherein an instruction sequence is stored on the storage medium which causes a data processing apparatus to perform a method according to claim 1.

11. A system according to claim 4, wherein
the first data processing apparatus (1) is suitably programmed
to redistribute overlay reachability information into the dynamic routing in the base network, and to redistribute base reachability information into the dynamic routing in the overlay network.

12. A system according to claim 4, wherein
the first data processing apparatus (1) is suitably programmed
to send and to receive overlay reachability information by using a conventional dynamic routing protocol.

13. A system according to claim 4, wherein
the first data processing apparatus (1) is suitably programmed
to send and to receive overlay reachability information by using a dynamic routing protocol tailored to IPsec which is an extension of the IKE protocol.

14. A system according to claim 4, wherein
each entry in the data structure (14) is suited to accommodate a plurality of specifications of logical tunnels (64, 65), wherein each of these specifications has a metric,
and the first data processing apparatus (1) is suitably programmed
to send outgoing datagrams which are matched by the selectors of an entry in the data structure (14), wherein this entry comprises at least two specifications of logical tunnels (64, 65),
alternatingly over the tunnels (64, 65) defined by the specifications of the entry, wherein the frequency with which datagrams are sent over one of the tunnels (64, 65) depends on the metric of this tunnel (64, 65).

15. A system according to claim 5, wherein
the first data processing apparatus (1) is suitably programmed
to redistribute overlay reachability information into the dynamic routing in the base network, and to redistribute base reachability information into the dynamic routing in the overlay network.

16. A system according to claim 5, wherein
the first data processing apparatus (1) is suitably programmed
to send and to receive overlay reachability information by using a conventional dynamic routing protocol.

17. A system according to claim 5, wherein
the first data processing apparatus (1) is suitably programmed
to send and to receive overlay reachability information by using a dynamic routing protocol tailored to IPsec which is an extension of the IKE protocol.

18. A system according to claim 5, wherein
each entry in the data structure (14) is suited to accommodate a plurality of specifications of logical tunnels (64, 65), wherein each of these specifications has a metric,
and the first data processing apparatus (1) is suitably programmed
to send outgoing datagrams which are matched by the selectors of an entry in the data structure (14), wherein this entry comprises at least two specifications of logical tunnels (64, 65),
alternatingly over the tunnels (64, 65) defined by the specifications of the entry,
wherein the frequency with which datagrams are sent over one of the tunnels (64, 65) depends on the metric of this tunnel (64, 65).

\* \* \* \* \*